(12) United States Patent
Allard et al.

(10) Patent No.: US 6,312,150 B1
(45) Date of Patent: *Nov. 6, 2001

(54) SPEED CONTROL FOR A MIXER FOR PROVIDING AN INCREMENTAL POWER BOOST

(75) Inventors: John J. Allard, Hattiesburg; William Michael Kennedy, Petal, both of MS (US)

(73) Assignee: Sunbeam Products, Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,093

(22) Filed: Apr. 25, 1997

(51) Int. Cl.[7] ................. B01F 7/00; H02P 7/288
(52) U.S. Cl. ............................ 366/206; 388/840
(58) Field of Search ................ 366/129, 197, 366/200, 201, 206, 207, 601; 241/168, 169.1; 388/824, 837, 838, 839, 840, 326, 327, 936

(56) References Cited

U.S. PATENT DOCUMENTS

| | | | | |
|---|---|---|---|---|
| 1,966,558 | * | 7/1934 | O'Hagan | 388/840 |
| 3,422,330 | * | 1/1969 | Swanke | 388/838 |
| 3,562,616 | * | 2/1971 | Elliott | 388/839 |
| 3,612,969 | * | 10/1971 | Cockroft | 388/840 |
| 3,648,142 | * | 3/1972 | Corey et al. | 388/838 |
| 3,670,226 | * | 6/1972 | Mazza | 388/840 |
| 3,833,845 | * | 9/1974 | Smallbone et al. | 388/840 |
| 3,887,856 | * | 6/1975 | Cicchiello | 388/838 |
| 3,924,169 | * | 12/1975 | Craft et al. | 366/129 |
| 4,002,961 | * | 1/1977 | Chang | 388/838 |
| 4,296,363 | * | 10/1981 | Blake et al. | 388/840 |
| 4,309,631 | * | 1/1982 | Christensen | 388/827 |
| 5,310,259 | | 5/1994 | Wanat | 366/349 |
| 5,455,886 | * | 10/1995 | Glenn et al. | 388/838 |

* cited by examiner

*Primary Examiner*—Tony G. Soohoo
(74) *Attorney, Agent, or Firm*—Kramer Levin Naftalis & Frankel, LLP.

(57) ABSTRACT

A stand mixer having an electrical speed control circuit for providing a temporary incremental power burst to the motor of the mixer.

14 Claims, 15 Drawing Sheets

| REFERENCE | DESCRIPTION |
|---|---|
| R1 | 10K, ohm, 1W resistor |
| R2 | 390K, ohm, 1/4W resistor |
| R3 | 110K, ohm, 1/4W resistor |
| R4 | 220K, ohm, 1/4W resistor |
| R5 | 1K, ohm, 1/4W resistor |
| R6 | 24K, ohm, 1/4W resistor |
| R7 | 16K, ohm, 1/4W resistor |
| R9 | 160K, ohm, 1/4W resistor |
| R10 | 2.2K, ohm, 1/4W resistor |
| R11 | 390K, ohm, 1/4W resistor |
| R12 | 220K, ohm, 1/4W resistor |
| R13 | 130K, ohm, 1/4W resistor |
| R14 | 27K, ohm, 1/4W resistor |
| R50 | 10K, ohm |
| R31 | 220K, ohm, slide potentiometer |
| C1 | 22uF, 50WV, 20%, electrolytic capacitor |
| C2 | .0033uF, 25WV, ceramic capacitor |
| C4 | .22uF, 25WV, ceramic capacitor |
| C5 | .001uF, 25WV, ceramic capacitor |
| C6 | .22uF, 25WV, ceramic capacitor |
| C7 | 4.7uF, 50WV, 20%, electrolytic capacitor |
| C9 | 4.7uF, 50WV, 20%, electrolytic capacitor |
| C11 | .01uF, 25WV, ceramic capacitor |
| D1 | 1 amp 400V, IN4004 diode |
| TH1 | triac, 600V |
| U1 | U211B2 phase controller IC |

FIG. 19

SPEED CONTROL FOR A MIXER FOR PROVIDING AN INCREMENTAL POWER BOOST

FIELD OF THE INVENTION

The present invention relates to food mixing apparatus, and in particular, devices referred to as "stand mixers", which include a mixer head placed on a stand to allow hands-free mixing of food items.

BACKGROUND OF THE INVENTION

Stand mixers have been employed for decades to assist in the commercial and domestic preparation of food requiring mixing and/or kneading. Such stand mixers typically include a base or stand on which a rotatable turntable rests for holding mixing bowls of various sizes. In order to change from one size mixing bowl to the other, it is generally necessary to lift the turntable and reposition it in a different hole in the base. This task can be inconvenient, particularly for the elderly who may have difficulty lifting and/or repositioning the turntable and bowl, particularly if the turntable has become caked with batter or other food ingredients which may tend to cause the turntable to stick to the base.

Stand mixers also typically employ a pair of whippers which are attached to the front of the mixer and extend downwardly into the bowl containing food ingredients to be mixed.

While traditional whippers are effective in mixing, there is a tendency, particularly with thick batter or dough, to creep up the center bar that supports the whipper blades. This phenomenon, known as "dough creep" can potentially result in dough being driven up to the mixer head, fouling the gearing mechanisms, and potentially throwing dough and/or batter out of the bowl.

Prior stand mixers have also commonly used variable speed control mechanisms, such as dials, knobs, slide levers, etc. While such speed controls are effective for incremental speed changes, they do not generally provide a "burst" or rapid speed change which is frequently desirable to break up large clumps for a short period of mixing time only.

In general, stand mixers of the prior art have permitted the user to lock the head in the up and/or down position or to remove the mixer head from the stand, but not perform all three functions. Locking the mixer head in the up position is desirable because it prevents the head from falling back into the bowl. For purposes of carrying the mixer by the handle, it is desirable to be able to lock the mixer head in the down position. Furthermore, locking the mixer head in the down position alleviates bouncing by the mixer head in heavy dough. Removing the mixer head completely from the stand may often be desirable for individuals wishing to use the mixer as a hand mixer rather than a stand mixer.

Other problems inherent in stand mixers is the tendency for water, milk, batter, and other ingredients and liquids to collect in the base of the turntable and cause the bottom of the mixer bowl to stick to the bottom of the turntable, rendering removal of the bowl problematic.

SUMMARY OF THE INVENTION

The present invention solves one or more of the above-referenced problems of the prior art by providing a whipper design which includes no center bar, thereby eliminating the "dough creep" phenomenon of the prior art. The whippers include increased thickness in the whipper blades, which surprisingly results in no deterioration of mixer performance.

In another embodiment of the invention, a turntable locator is provided which enables the user to adjust the stand mixer to accommodate different bowl sizes without removing the turntable. A slide lever is preferably employed to position the turntable in two or more positions.

In yet another preferred embodiment of the invention, an improved mixer head locking feature is provided which locks the mixing head in the down position, thereby preventing the mixer head from bouncing when the mixer is mixing heavy dough. The feature also allows the mixer head to be locked in the up position for added convenience, and further allows the mixer head to be removed completely from the stand to serve as a hand mixer.

In yet another preferred embodiment of the invention, the turntable includes a snap lock feature which eliminates the problem of the turntable sticking to the bottom of the bowl when the bowl is removed from the turntable.

In yet another preferred embodiment of the invention, the stand mixer includes an electrical speed control circuit for providing a temporary incremental power burst to the motor of the mixer.

These and other objects and advantages of the present invention will become more readily apparent from the following detailed description of the preferred embodiments and the accompanying drawings.

BRIEF DESCRIPTION OF THE DRAWINGS

FIG. 19 is a table of component values for the circuit diagram shown in FIG. 18.

DETAILED DESCRIPTION OF THE PREFERRED EMBODIMENT

Figure 1:
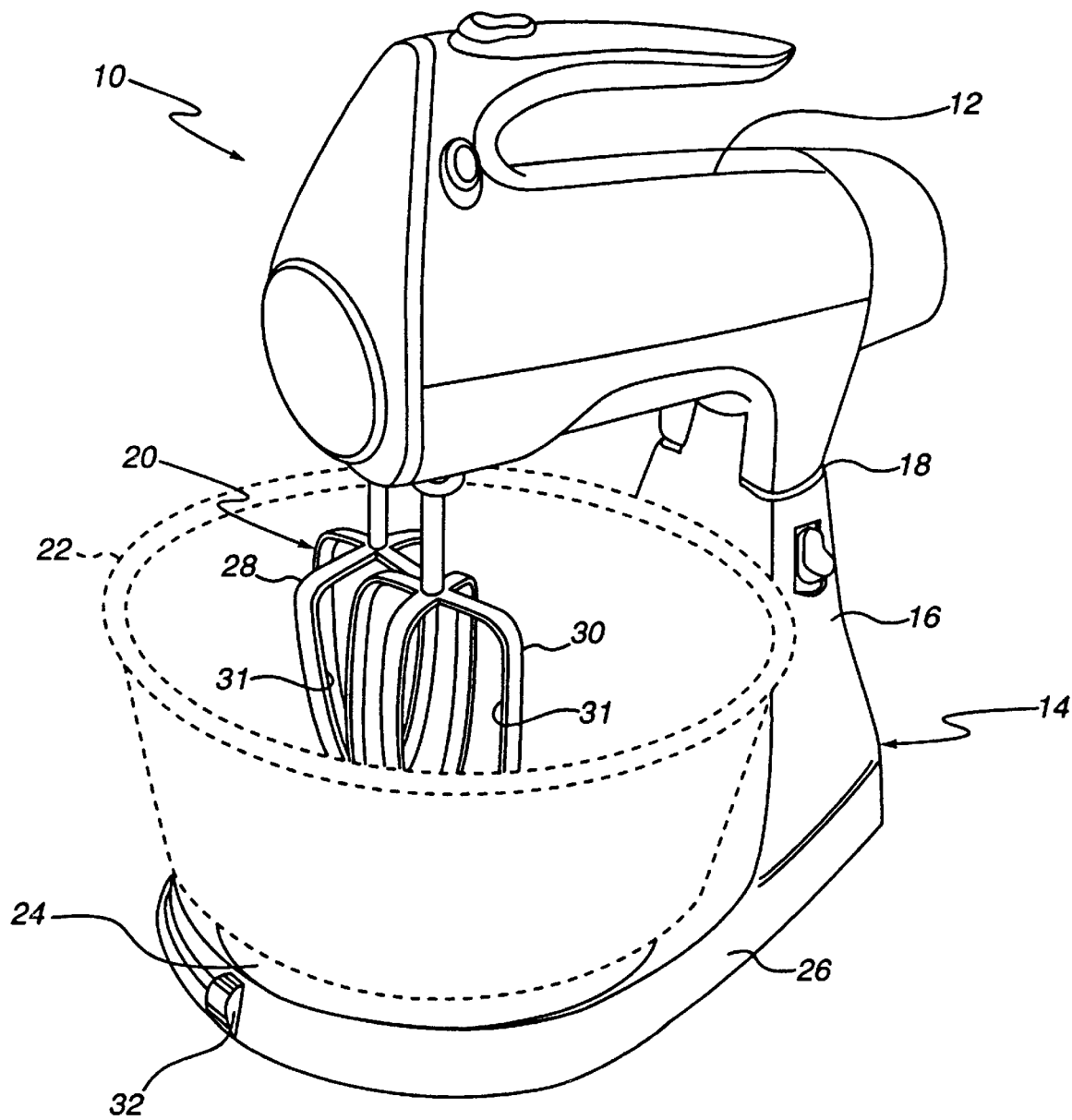
FIG. 1 is a perspective view of a preferred stand mixer on the present invention.

Referring now to FIG. 1, there is illustrated a preferred stand mixer of the present invention, generally 10, comprising a mixer head 12, and a base generally 14, having an upstanding pedestal portion 16 supporting the mixer head 12. The mixer head 12 in FIG. 1 is shown in the head down or operative position, but the mixer head 12 may also be pivoted into an upended or retracted position by virtue of a pivot point 18 and head lock/release mechanism to be subsequently described. The stand mixer includes whippers, generally 20, including an outboard whipper 28 and an inboard whipper 30. The whippers 28, 30 mix food and other items in a mixer bowl 22, which is supported on a turntable 24, which rotates within a base 26 of the stand 14.

Figure 2:
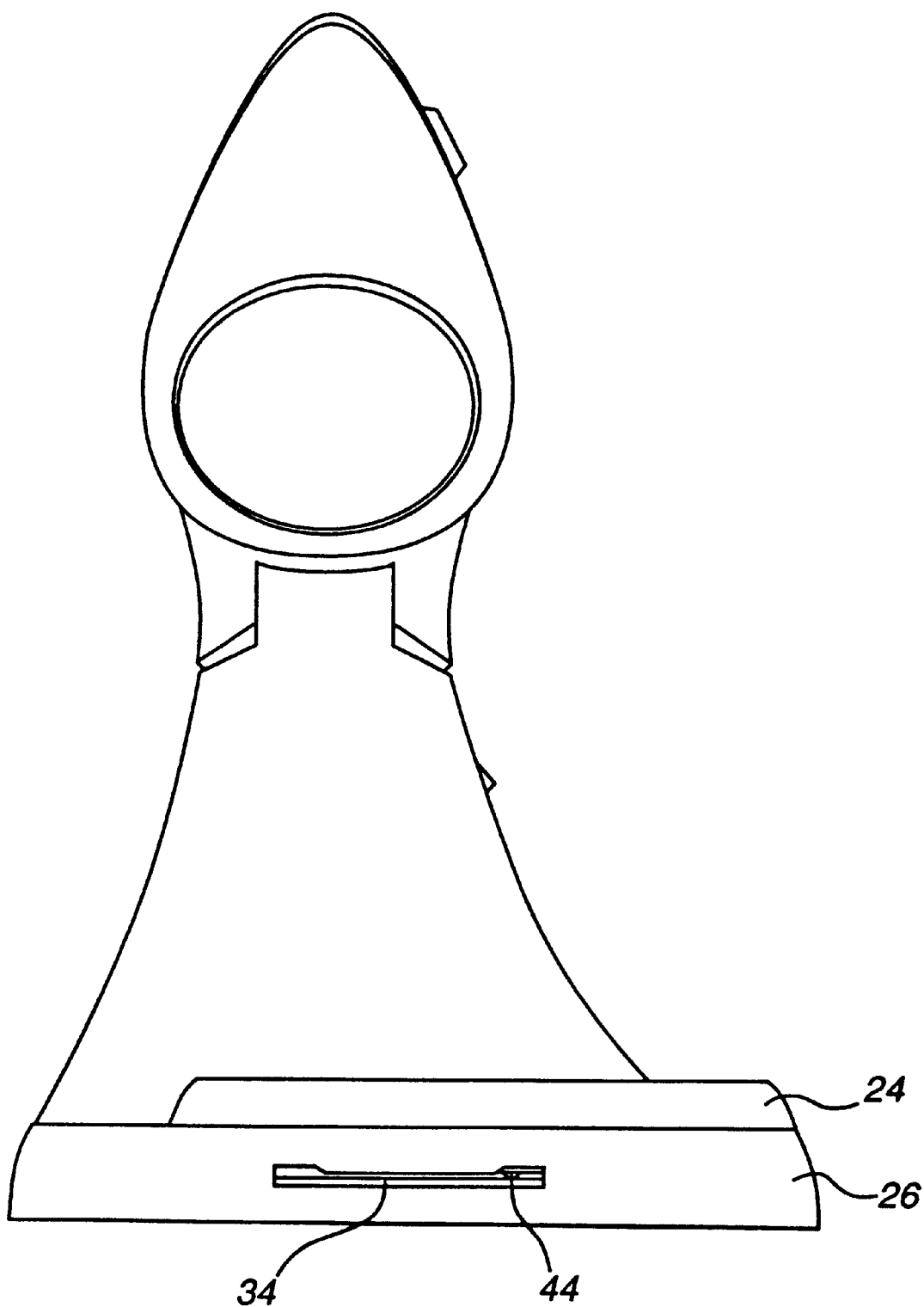
FIG. 2 is a front elevational view of the stand mixer of FIG. 1.
Figure 3:
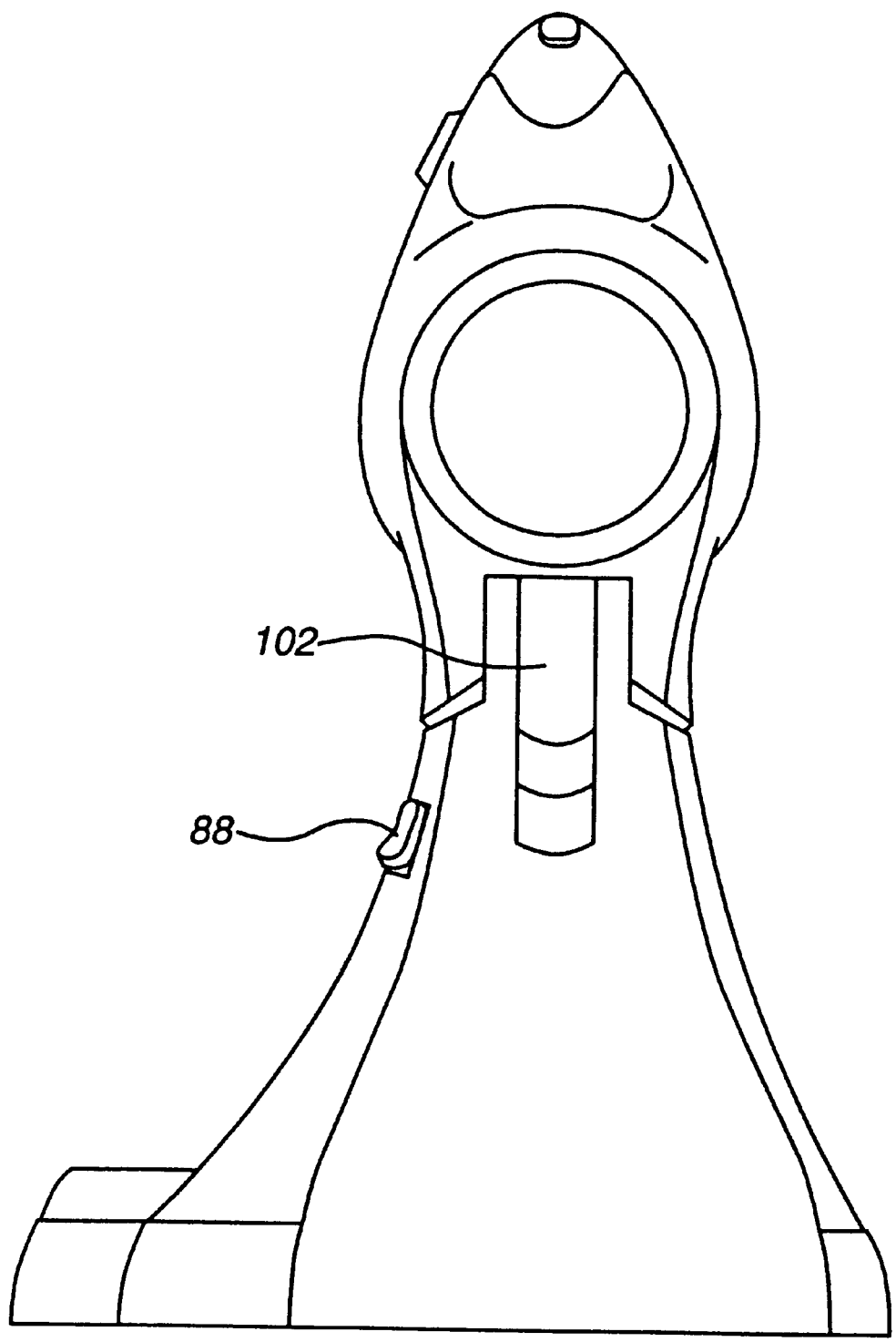
FIG. 3 is a rear elevational view of the stand mixer of FIG. 1.
Figure 4:
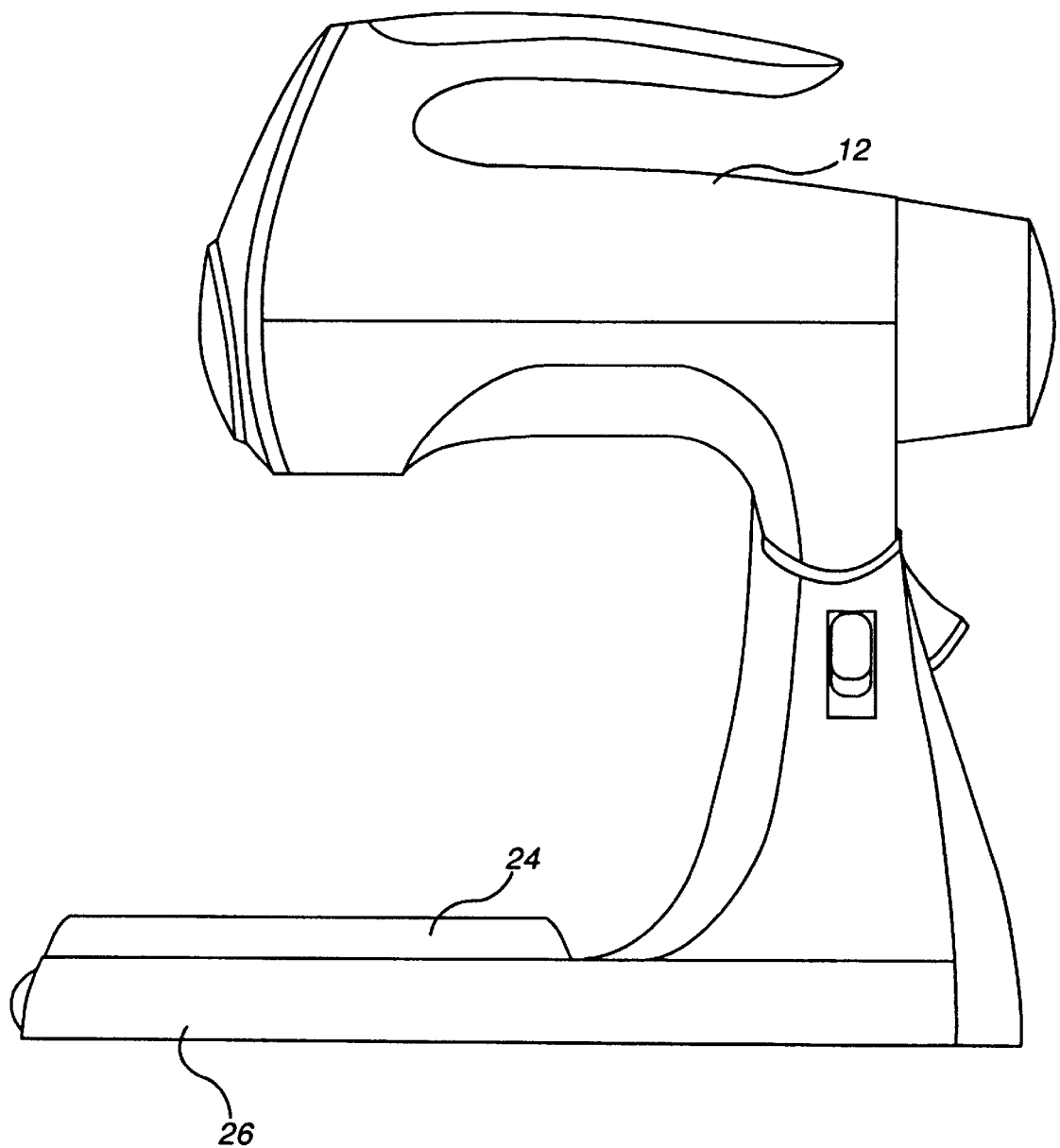
FIG. 4 is a left side elevational view of the stand mixer of FIG. 1.

In order to perform effective mixing, it is preferable to maintain the outboard whipper 28 in relatively close proximity to the side of the bowl 22, as is well known in the art. A problem arises when the user desires to use a differently sized bowl, which requires repositioning the turntable 24 to accommodate a need to maintain the outboard whipper 28 in close proximity with the smaller or larger sized bowl. In the past, this adjustment has commonly been accomplished by use of spaced holes in the base adapted to receive the axle of the turntable 24. This requires the user to lift the turntable 24 and locate the proper hole when switching from one size bowl to another. This problem is overcome by a highly preferred embodiment of the invention which includes a turntable locator feature for moving the turntable 24 from one location to another on the base 26 without the need to remove the turntable 24 from the base 26 and hunt for the appropriate location in the base 26 for the turntable. In a highly preferred embodiment the turntable locator feature includes a slide lever knob 32 which, as seen in FIG. 2, travels within a slot 34 in the base 26. In a preferred embodiment, the turntable position is adjusted simply by sliding the control knob 32 in the slot 34.

Figure 5:
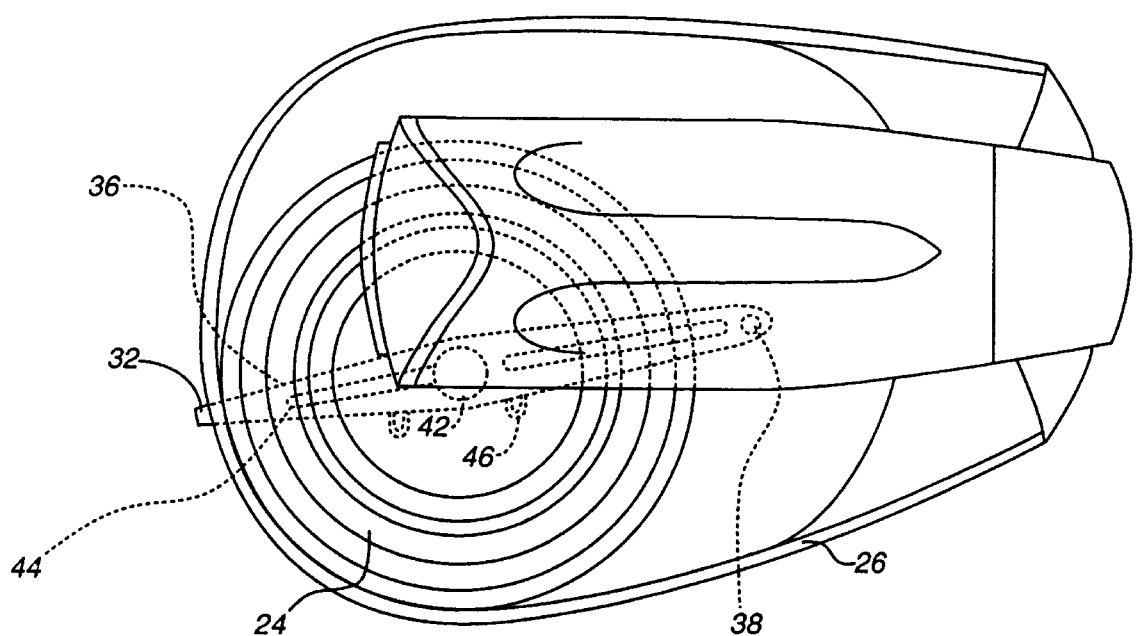
FIG. 5 is a top plan view of the stand mixer of FIG. 1.

Referring now to FIG. 5, there is illustrated the knob 32 which engages a lever 36 which pivots about a pivot 38 in the base 26.

Figure 6:
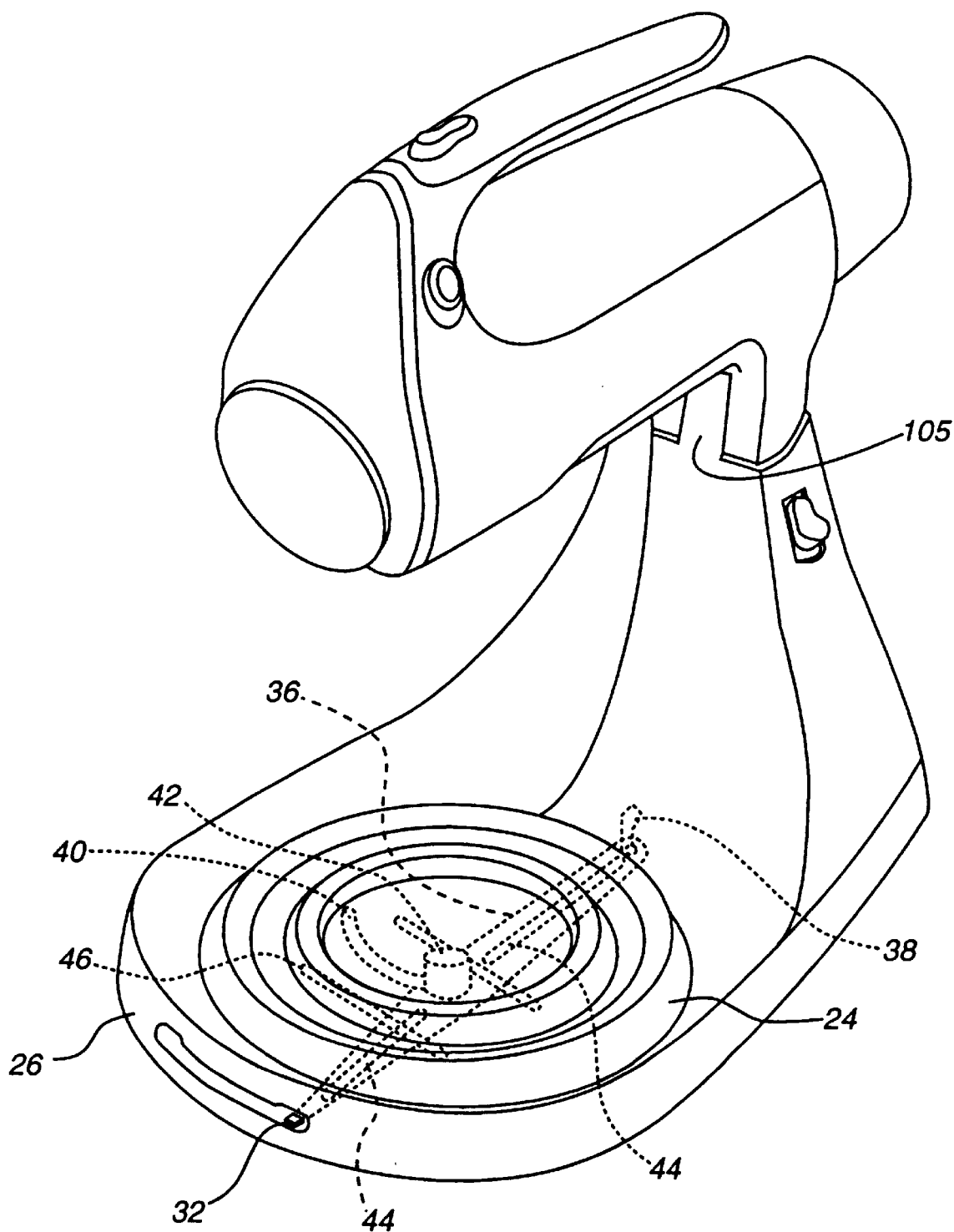
FIG. 6 is a perspective phantom line view of the stand mixer of FIG. 1.

As illustrated in FIG. 6, the base 26 includes a slot 40 through which an axle 42 of the turntable 24 passes. Preferably, this slot 40 is a semicircular curve, the center of which corresponds to the pivot point 38. The slot may also be arcuate, i.e., elliptical, or even straight, depending on the contour of the mixer base 26, the width of the slot, and the positioning desired for the turntable 24.

The lever 36 preferably includes ridges 44 (also seen in FIG. 9) which provides added strength to the lever and are generally formed by metal stamping procedures. These ridges 44 preferably ride on a pair of perpendicular ridges 46 in a base plate 48 on the underside of the base 26. These ridges cooperate to provide contact points for sliding the lever 44 and for biasing the lever in the appropriate turntable positions as will subsequently be described.

Figure 8:
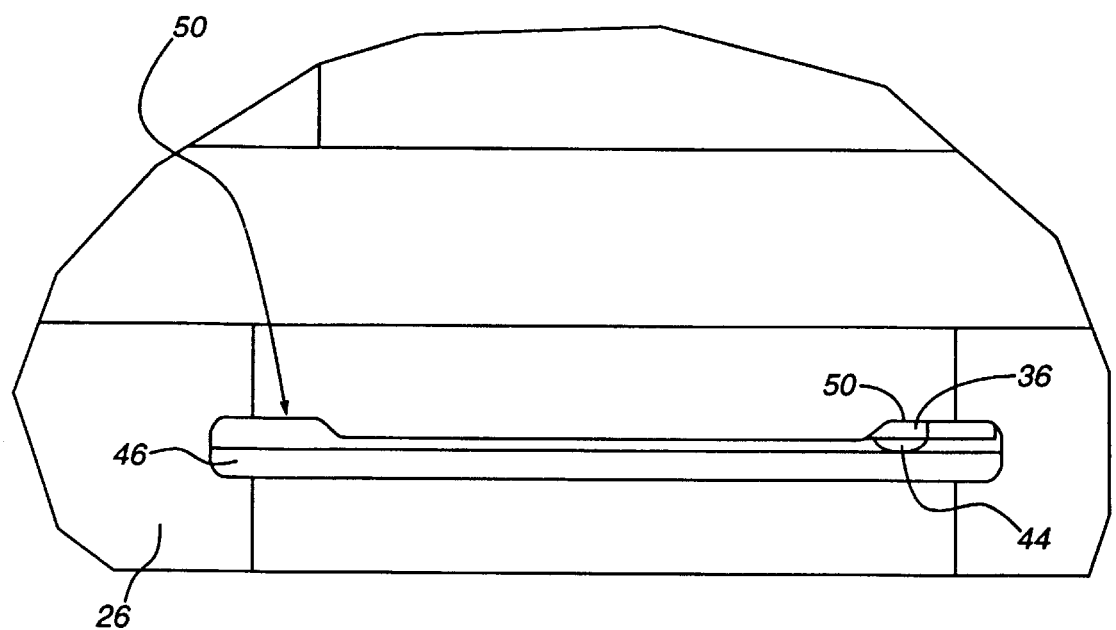
FIG. 8 is a detail of the turntable slide of a preferred embodiment of the present invention.

Referring now to FIG. 8, the lever 36 is retained in the desired position by one or more detents 50 in the base 26. In order to relocate the turntable, the user depresses the lever 36 by pressing down on the control knob 32 in order to overcome the biasing force of the lower ridge 46 on the upper ridge 44, which allows the user to slide the lever 36 across the slot 34 until it reaches another detent 50 which allows the lever 36 to be retained in the new position. While only two detentes 50 are shown in FIG. 8, it would, of course, be possible to include additional detentes 50 for more than two bowl sizes. The axle 42 of the turntable 24 may be standard, passing through a hole in the axle 36, or may be of a snap lock type of a highly preferred embodiment of the present invention, described subsequently.

Figure 9:
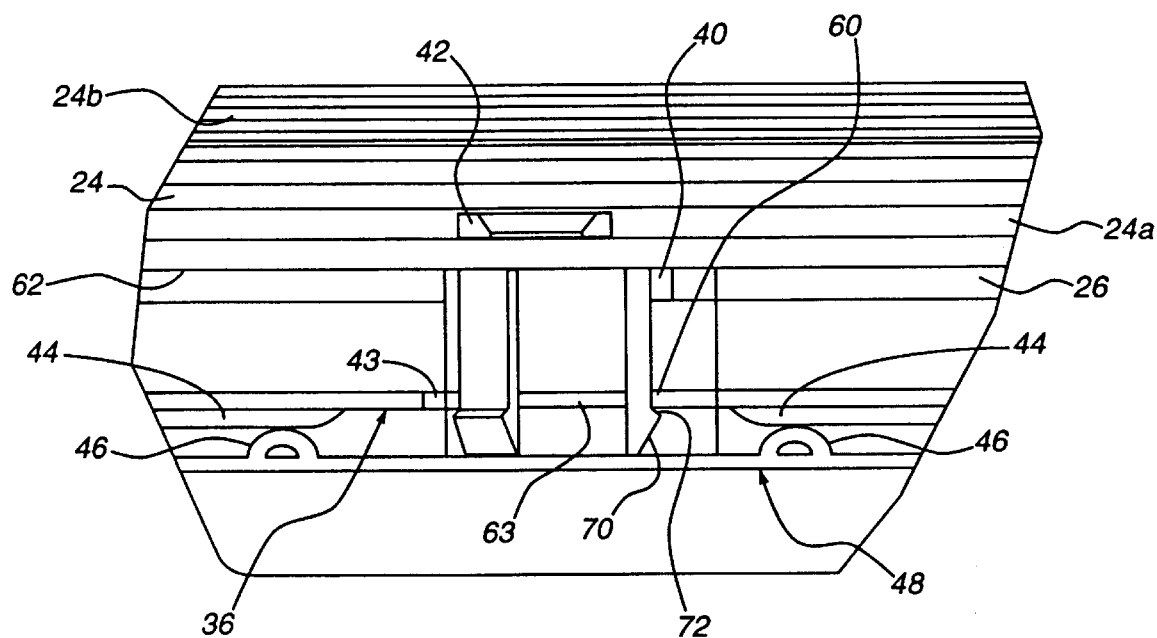
FIG. 9 is a detail of a preferred snap lock for the turntable of a preferred embodiment of the present invention.

Referring now to FIG. 9, there is illustrated a snap lock mechanism of a preferred embodiment of the invention. In this embodiment, the turntable snaps into place within the base of the mixer, eliminating the tendency for the turntable to stick to a bowl and be inadvertently removed when the bowl is removed from the mixer. In this embodiment, the turntable 24 includes a series of snaps 60 extend downwardly from the underside 62 of the turntable 24. In the embodiment illustrated in FIG. 9, the snaps 60 extend through an opening 63 in the lever 36 previously described. In another preferred embodiment, the turntable snaps may extend through a hole in the base 26. In this embodiment, the lever 36 is not employed, and the turntable passes through holes in the base itself.

In the embodiment shown in FIG. 9, the snaps 60 also extend through the slot 40 in the base. In a preferred embodiment to the invention, there are three snaps 60, preferably equally spaced. The snaps 60 may perform integral with the axle 42, or may be attached to the underside of the turntable 62 and separate from the axle 42. Generally, the axle 42 remains stationary allowing the lower platter 24a to remain stationary with respect to the upper platter 24b of the turntable which preferably rides on a bearing allowing the upper platter 24b to turn with respect to the lower platter 24a. In addition to the use of snaps 60, it is also possible to use other snap fit mechanisms, such as an annular ring which can be molded directly into a cylindrical shaft extending downwardly from the axle 42 and be snap fit into a corresponding groove in either the bottom of the stand 26 or in the lever 36. Also, it would be possible to have an axle and/or snaps extend upwardly from the base 26 and/or turntable 36 in order to receive a complimentary opening in the base 62 of the lower platter 24a.

As illustrated, the snaps 60 preferably have an inclined surface 70 which urges the snap 60 inwardly as it passes through the opening 63 in the lever 36. Another surface 72 which may also be a straight incline, but may also be a curved surface, is contoured to retain the clip 60 and hence the turntable 24 within the base 26. This same surface 70 is also contoured to allow the user to overcome the retention forces of the clip 60 by applying a predetermined pulling force sufficient to ensure that the turntable 24 is not removed unless it is intended to be removed by the user.

Figure 7:
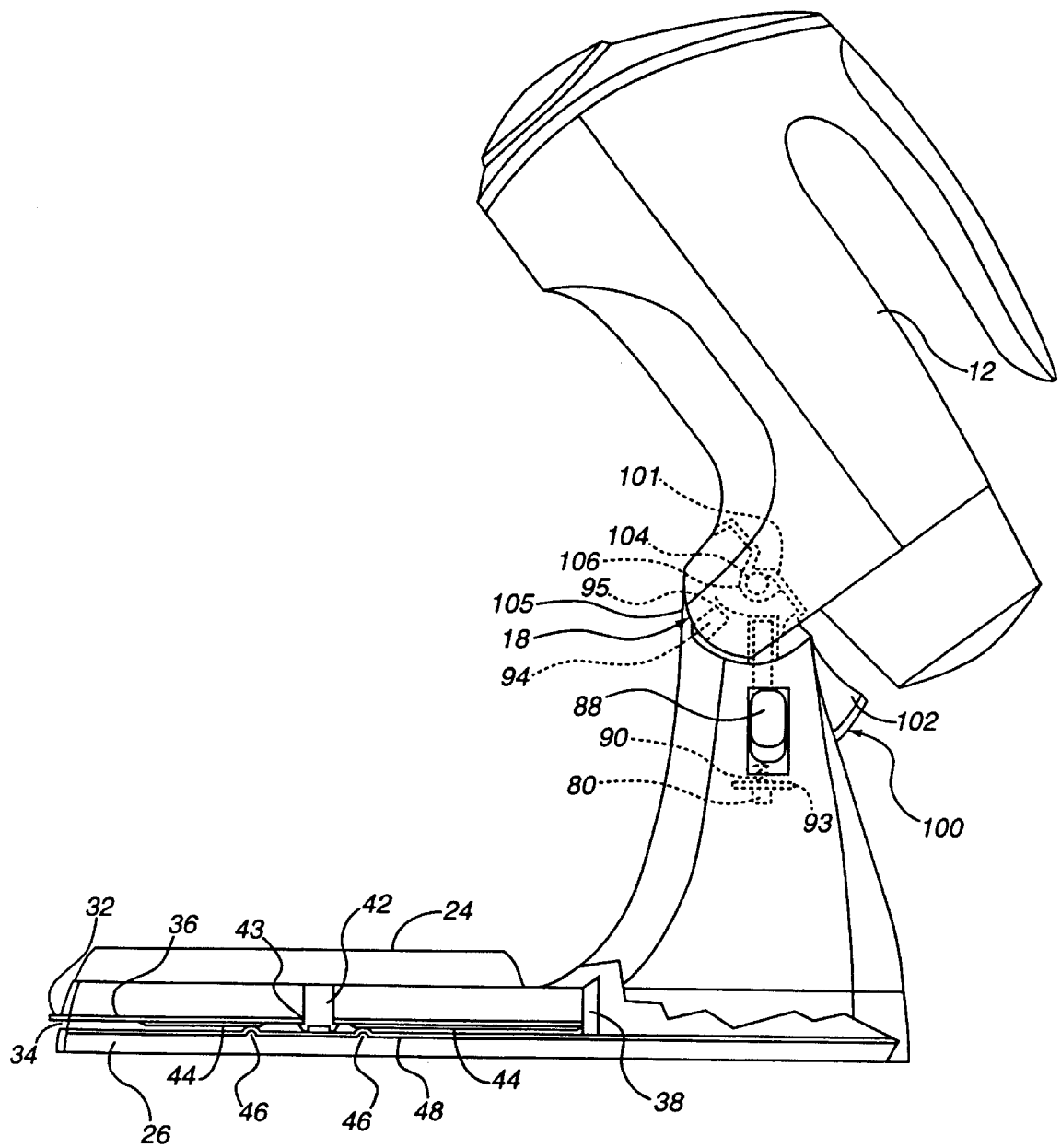
FIG. 7 is a side elevation showing the mixer head in a retracted position.
Figure 10:
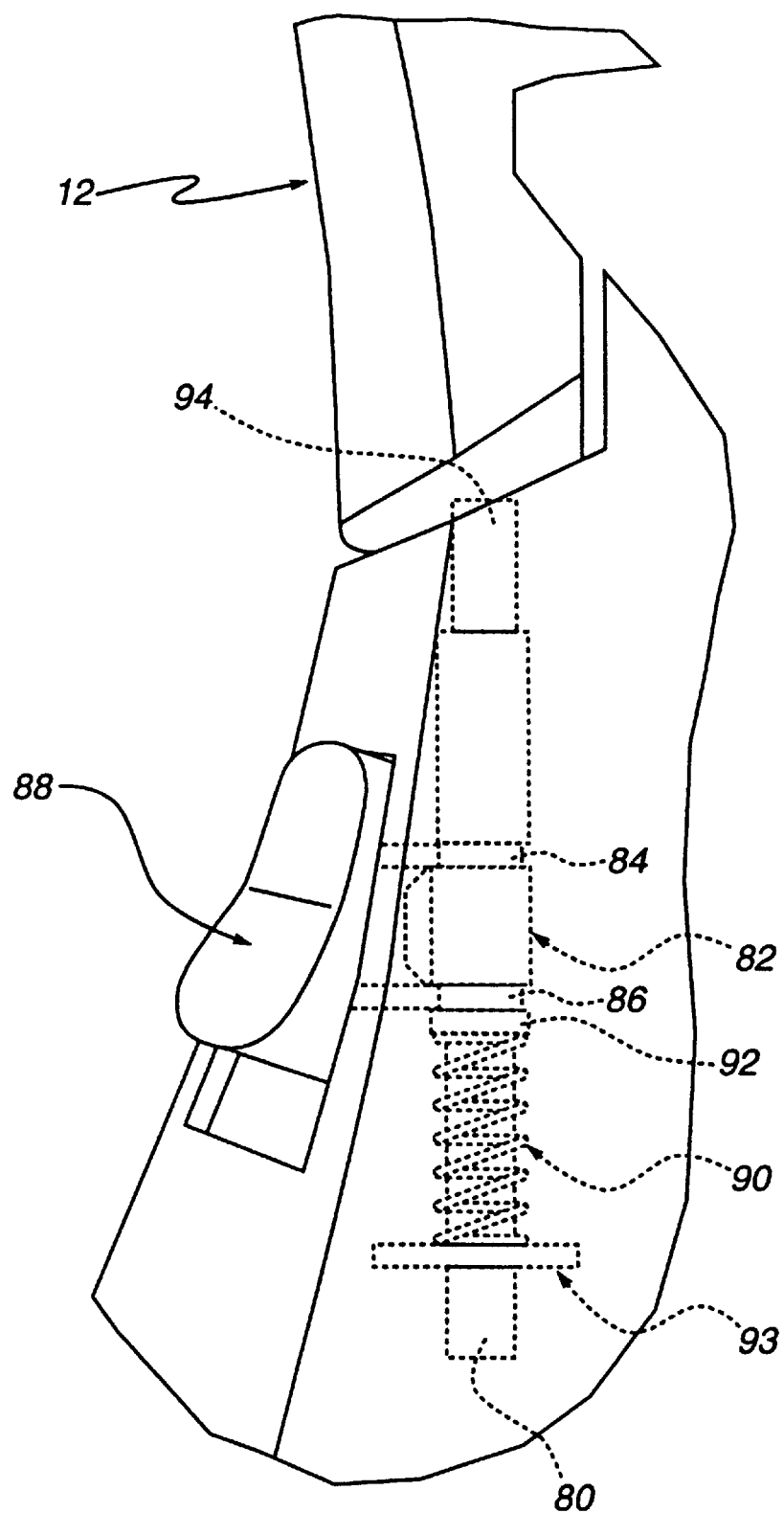
FIG. 10 is a phantom line view of a preferred head lock mechanism of the present invention.
Figures 11, 12:
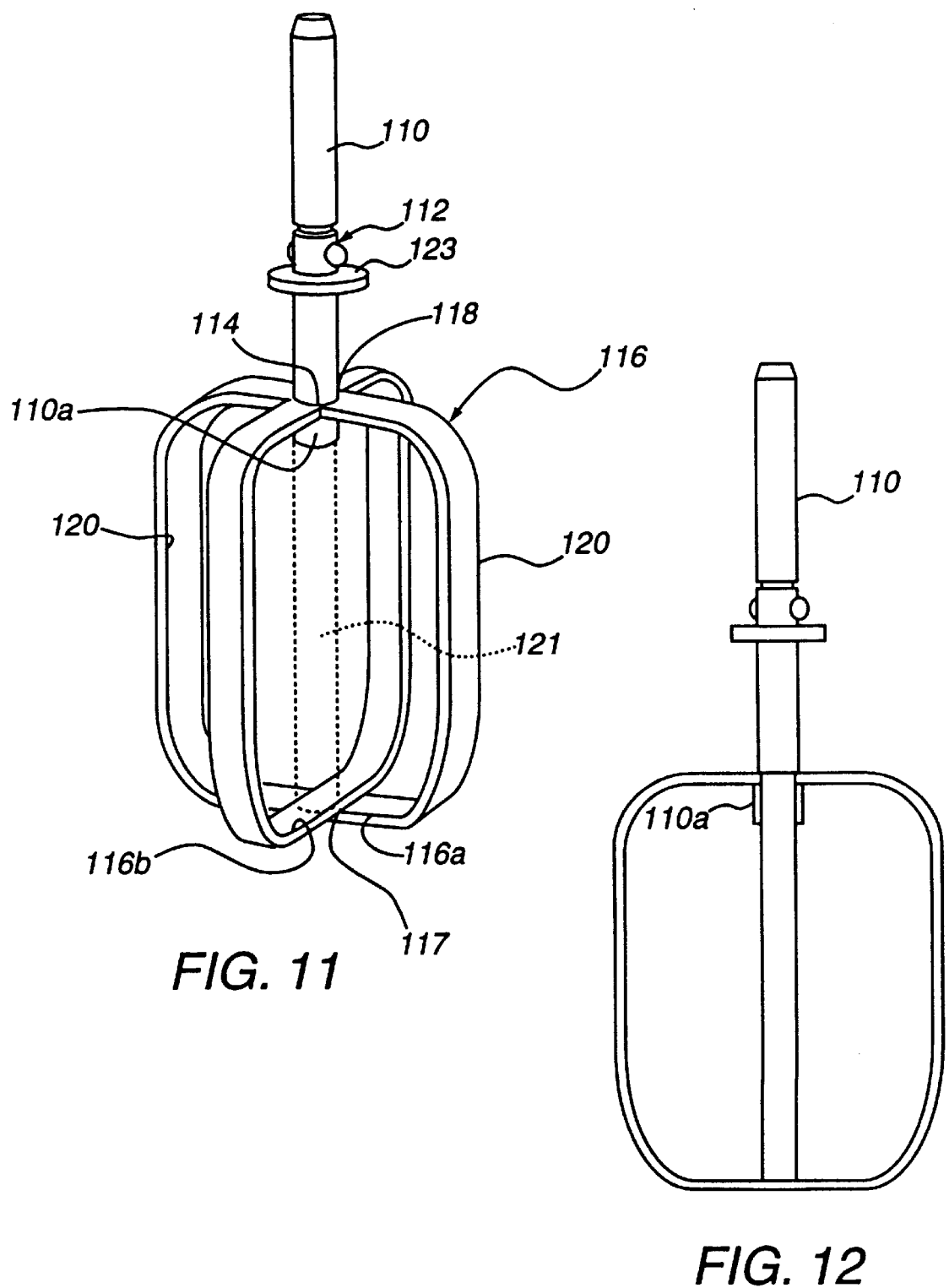
FIG. 11 is a perspective view of a preferred band whipper of the present invention.
FIG. 12 is a side elevation of the band whipper of FIG. 11.
Figure 13:
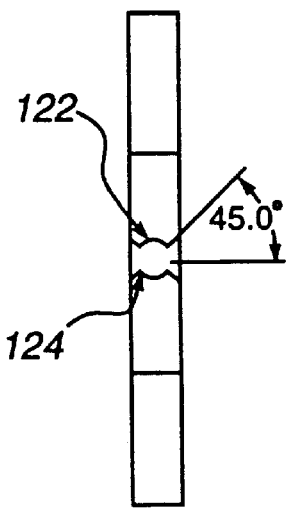
FIG. 13 is a top plan view of a band for use with the preferred band whipper of the present invention.
Figure 14:
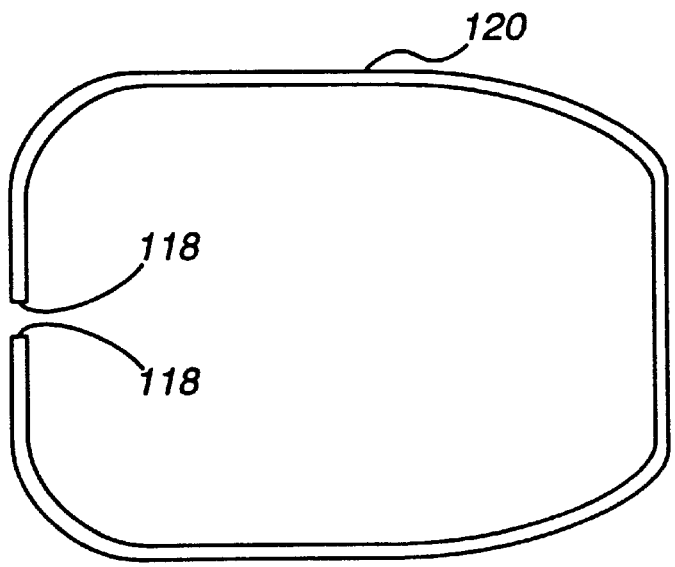
FIG. 14 is a side elevation view of the band of FIG. 13.
Figure 15:
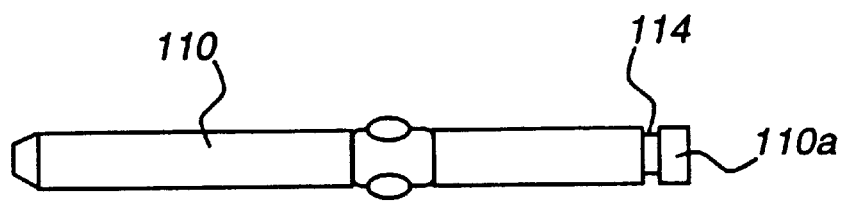
FIG. 15 is a side elevation view of a shaft or spindle for use with the band whipper of FIG. 11.
Figure 16:
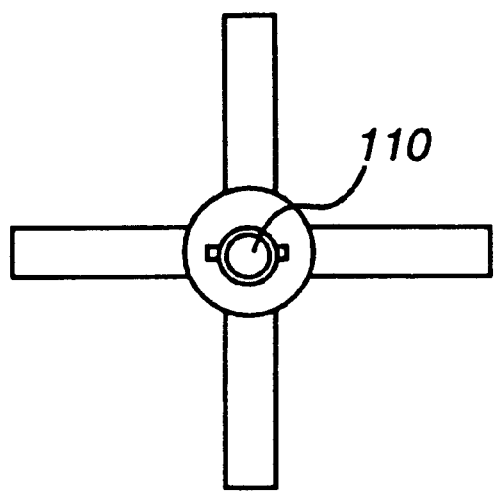
FIG. 16 is a top plan view of the band whipper of FIG. 11.
Figure 17:
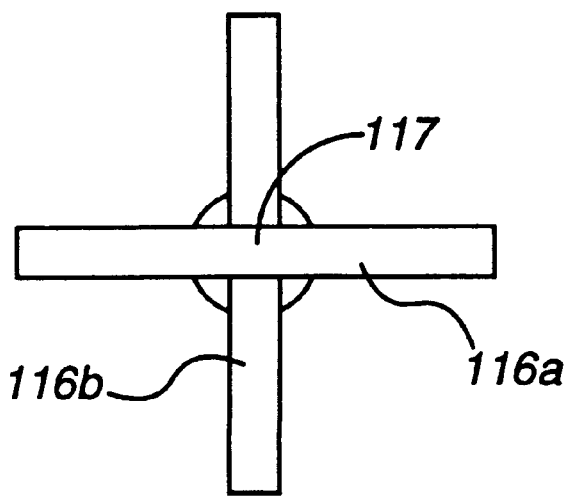
FIG. 17 is a bottom plan view of the band whipper of FIG. 11.

Turning now to FIGS. 7 and 10 there is illustrated yet another preferred embodiment of the invention comprising an improved headlock mechanism. The improved headlock mechanism comprises a locking pin generally 80 which carries a locking flange 82 which is governed by two fork members 84, 86 attached to a button 88. The locking flange may be a groove in the locking pin 80, a projection, a nut, or any other point of engagement between the locking pin 80 and the fork members 84, 86. While two fork members 84, 86 are illustrated, only one could be used as well.

The locking pin 80 is biased upwardly by a spring 90, the spring being compressed between a washer or nut 92 and a stationary guide plate 93 anchored to the pedestal. The locking pin 80 in its normal position is biased upwardly into a recess 94 contained within the mixer head, thereby precluding the mixer head from being pivoted rearwardly. In order to disengage the mixer head and pivot same in a rearward orientation, the button 88 which may be a momentary switch type, is compressed and held downwardly, which acts upon the forks 84, 86 which in turn drive the locking flange 82 downwardly, thereby driving the locking pin 80 downwardly through a hole in the guide plate 93 and out of the recess 94, enabling the user to rotate the mixer head 12 rearwardly about the pivot point generally 18, as illustrated in FIG. 7. As an alternative, the button 88 may engage a detent or other momentary holding device to hold the button in its down position.

Once the mixer head 12 is fully rotated rearwardly, the lock pin 80 can be released by releasing the button 88, thereby engaging another recess 95 in the housing of the mixer head 12 and thereby locking the head 12 in the upright position as illustrated in FIG. 7.

Because the locking pin 80 is slideably received within the recess 94, it does not prevent the mixer head 12 from being removed vertically from the stand. The mechanism, generally 100, for removing the head 12 from the stand may be conventional, such as that currently used on the Mixmaster® Model 2360 Stand Mixer sold by Sunbeam Products, Inc., Hattiesburg, Miss. Such a mechanism generally includes a latch/spring clip 101 actuated by a release button 102 at the rear of the stand, which clip 101 engages a horizontal pivot pin 104 riding in a yoke 105 in the pedestal and passing through a flange 106 in the mixer head. The pivot pin 104 provides the point of engagement for the spring clip 101, thereby retaining the mixer head 12 on the pedestal 16, and also allows the mixer head 12 to pivot about the curvilinear pivot point 18 defined by the mixer head 12 and pedestal 16. Thus, while the locking pin 80 precludes the mixer head while in its upward or downward position from shifting positions, the fact it is slideably received in the recess of the mixer head allows the mixer head to be removed from the stand.

Of course, it would be feasible to provide recesses in addition to recesses 94 and 95 in the mixer head in order to allow locking the head in intermediate positions. Alternatively, only one of the recesses 94 or 95 could be provided. Also, rather than using a spring 90, it would be feasible to employ a slide mechanism with a lock or detent for retaining the locking pin 80 in its upward position within the mixer head recess 94 or 95. The lock or detent would require the user to use sufficient force to overcome the lock or detent to retract the locking pin 80.

The stand mixer of the present invention preferably includes a power burst button 11 (FIG. 1) for substantially immediately providing a temporary incremental power burst to the motor of the mixer so long as button 11 is depressed. In one embodiment, the stand mixer includes twelve established speeds, the lowest speed (1) corresponding to a motor speed of approximately 300 rpm, and the highest speed (12) corresponding to a motor speed of approximately 1000 rpm. All of the speeds in this embodiment are approximately 58 rpm apart. In the preferred embodiment, pushing power burst button 11 causes the motor speed to be increased by approximately 100 rpm regardless of the established speed setting, thus temporarily boosting the motor speed to a speed equivalent to approximately two established speeds thereabove. It should be noted that the present invention can be implemented in a mixer having any number of motor speeds and corresponding rpm values, and can be modified to provide boosts of speed of any desired magnitude or rpm increase.

Figure 18:
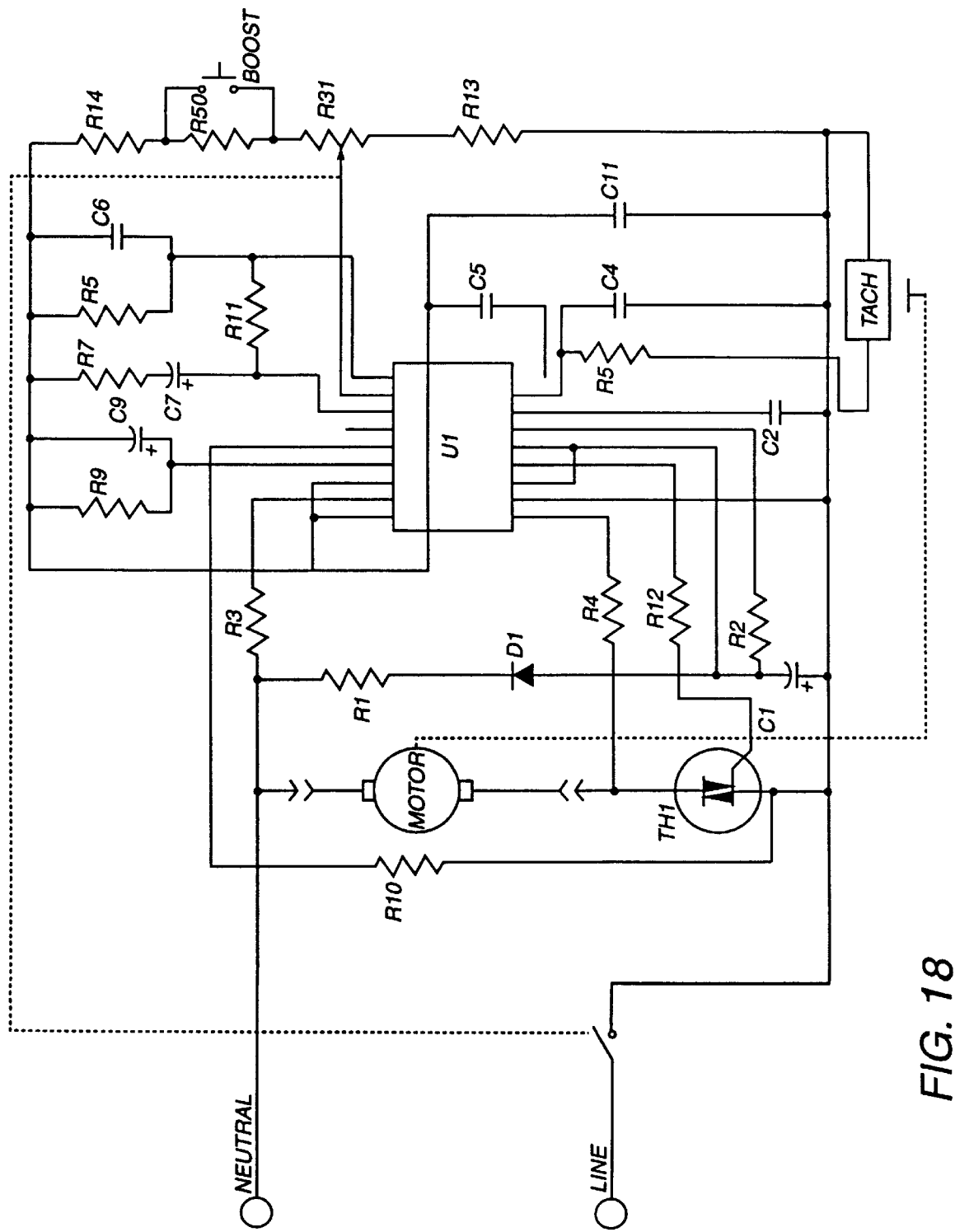
FIG. 18 is the electrical circuit diagram of one embodiment of the speed control of the present invention.

FIG. 18 shows the electrical circuit diagram of one embodiment of the speed control of the present invention. The circuit structure and component values (See FIG. 19) are meant to be for illustrative purposes only, it being understood that the present invention can be implemented in virtually any conventional speed control circuit for a mixer. In FIG. 18, the motor speed is controlled by the firing angle of triac TH1 which is controlled by output pin 4 of integrated circuit U1. Input pin 11 to U1 is a voltage "speed set" input determined by the voltage divider of R14, R50, R13 and potentiometer R31. Output pin 10 of U1 provides a voltage that is directly related to the motor speed because U1 includes a frequency to voltage converter which converts the frequency input from the tach at input pin 8 to a DC voltage at output pin 10. The frequency at input pin 8 can be derived by hall effect or coil magnetic pick-up methods, or any other method known to one of ordinary skill in the art.

U1 will increase the voltage to the motor, via output pin 4, based on the pin 11 input voltage until the voltage at output pin 10 is equal to the pin 11 input voltage. If the pin 10 voltage is higher than the pin 11 voltage, U1 will decrease the motor speed until the two voltages are equal.

When power burst button 11 is depressed (shown as a normally open contact in FIG. 18), resister R50 is shorted out, thus increasing the "speed set" voltage input to pin 11 of U1 via the operation of the voltage divider network. This, in turn, causes the motor speed to be increased as discussed above. Resistor R50, although indicated as a 10K ohm resister, may be sized to cause a voltage change equal to any desired burst speed change.

Although the invention has been described in detail with reference to specific examples and preferred embodiments and illustrations, it is to be understood that the full scope of the invention is defined by the following claims, as fairly interpreted, including all equivalents thereof.

We claim:

1. A mixer comprising:
   a housing;
   a motor disposed within said housing, said motor adapted for connection to one or more whippers;
   a speed control circuit for operating said motor at one of a plurality of established, user-selectable speeds; and
   a button coupled with said speed control circuit which, when depressed by the user of said mixer, causes the speed of said motor to increase by a predetermined increment from one of said plurality of established user-selectable speeds, until said button is released, wherein said predetermined increment is approximately equivalent to twice the difference in speed between two adjacent established speeds.

2. The mixer of claim 1 wherein said predetermined increment is adjustable.

3. The mixer of claim 1 wherein said speed control circuit generates a first voltage representative of the sensed speed of said motor and a second voltage representative of the user-selected speed, and produces a signal for controlling said motor based on said first and said second voltages.

4. The mixer of claim 3 wherein said second voltage is generated by a potentiometer interconnected with a plurality of resistors and wherein said button is connected across one of said plurality of resistors.

5. A speed control circuit for the motor of a mixer comprising:
   a first portion for generating a first voltage, said first voltage representing a user-selected speed;
   a second portion for generating a second voltage, said second voltage representing the sensed speed of said motor;
   a third portion for producing a signal for controlling the speed of said motor based on said first and said second voltages; and
   a button coupled with said third portion which, when depressed by the user of said mixer, causes the speed of said motor to increase by a predetermined increment from said user-selected speed until said button is released.

6. The speed control circuit of claim 5 wherein said predetermined increment is adjustable.

7. The speed control circuit of claim 5 wherein said predetermined increment is approximately equivalent to twice the difference in speed between two adjacent established speeds.

8. The speed control circuit of claim 6 where said second portion of said speed control circuit includes a tachometer coupled to a frequency to voltage converter.

9. The speed control circuit of claim 5 where said second portion of said speed control circuit includes a Hall effect sensor coupled to a frequency to voltage converter.

10. The speed control of claim 5 wherein said second portion of said speed control circuit comprises a potentiometer interconnected with a plurality of resistors and wherein said button is connected across one of said plurality of resistors.

11. The speed control circuit of claim 5 where said circuit for producing a signal for controlling the speed of said motor includes an integrated circuit for producing a gating signal, and a triac responsive to said gating signal for conducting current through said motor.

12. A combination comprising:
a motor;
a circuit for operating said motor at one of a plurality of established, user-selectable speeds; and
a button coupled with said circuit which, when depressed by a user, causes the speed of said motor to increase by a predetermined increment from said one of a plurality of established user-selectable speeds, until said button is released,
wherein said predetermined increment is adjustable.

13. The combination of claim 12 wherein said predetermined increment is approximately equivalent to twice the difference in speed between two adjacent established speeds.

14. A circuit for controlling the speed of a motor comprising:
means for selecting a speed;
means for operating said motor at said selected speed; and
means, when activated by a user, for causing the speed of said motor to increase by a predetermined increment above said selected speed,
wherein said predetermined increment is adjustable.

* * * * *